United States Patent
Aoki et al.

(10) Patent No.: US 7,099,928 B2
(45) Date of Patent: *Aug. 29, 2006

(54) DATA OUTPUT CONTROL DEVICE AND PORTABLE TERMINAL

(75) Inventors: Mikio Aoki, Suwa (JP); Shinya Taniguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 818 days.

This patent is subject to a terminal disclaimer.

(21) Appl. No.: 09/949,667

(22) Filed: Sep. 12, 2001

(65) Prior Publication Data

US 2002/0026479 A1    Feb. 28, 2002

Related U.S. Application Data

(63) Continuation of application No. PCT/JP01/00172, filed on Jan. 12, 2001.

(30) Foreign Application Priority Data

Jan. 12, 2000  (JP)  ............................ 2000-003932

(51) Int. Cl.
    *G06F 15/16*  (2006.01)
(52) U.S. Cl. ...................... 709/217; 709/205; 709/213; 709/226; 709/229; 710/5; 710/65
(58) Field of Classification Search ............... 709/205, 709/213, 217, 226, 229; 710/5, 65
    See application file for complete search history.

(56) References Cited

U.S. PATENT DOCUMENTS

| 4,985,850 | A | * | 1/1991 | Okamoto | 358/1.9 |
| 5,357,562 | A | * | 10/1994 | Metser et al. | 379/88.24 |
| 5,481,367 | A | * | 1/1996 | Yokoe et al. | 358/296 |
| 5,559,933 | A | * | 9/1996 | Boswell | 358/1.15 |
| 5,787,240 | A | * | 7/1998 | Hansen et al. | 358/1.16 |
| 6,052,207 | A | * | 4/2000 | Takagi et al. | 358/452 |
| 6,119,137 | A | * | 9/2000 | Smith et al. | 715/523 |
| 6,144,460 | A | * | 11/2000 | Omo et al. | 358/1.16 |
| 6,208,427 | B1 | * | 3/2001 | Lee | 358/1.15 |
| 6,259,405 | B1 | * | 7/2001 | Stewart et al. | 342/457 |
| 6,288,790 | B1 | * | 9/2001 | Yellepeddy et al. | 358/1.15 |
| 6,583,886 | B1 | * | 6/2003 | Ochiai | 358/1.15 |
| 6,618,160 | B1 | * | 9/2003 | Kato | 358/1.14 |
| 6,738,841 | B1 | * | 5/2004 | Wolff | 710/62 |
| 6,757,749 | B1 | * | 6/2004 | Aoki et al. | 710/5 |
| 6,792,485 | B1 | * | 9/2004 | Aoki et al. | 710/65 |

FOREIGN PATENT DOCUMENTS

| CN | 1233897 A | 4/1999 |
| EP | 0 954 147 A2 | 4/1999 |
| JP | 10-178670 | 6/1998 |
| JP | A 10-191453 | 7/1998 |

* cited by examiner

*Primary Examiner*—Zarni Maung
*Assistant Examiner*—Backhean Tiv
(74) *Attorney, Agent, or Firm*—Oliff & Berridge, PLC

(57) ABSTRACT

The present invention to provides a portable terminal and data output control device suitably used for readily obtaining detailed information on a network. The data output control terminal communicably connects a user-owned portable terminal, printing devices situated at various locations for outputting data, and WWW servers, via the Internet, receives data printing requests containing portable terminal position data generated by the portable terminal from the portable terminal, searches printing device position data of a storage device based on portable terminal position data contained in the data printing request, selects a printing device which is considered to be closest either distance-wise or time-wise with the position of the portable terminal as a reference, and outputs data relating to the data printing request to the selected printing device.

4 Claims, 6 Drawing Sheets

DATA OUTPUT CONTROL DEVICE AND PORTABLE TERMINAL

BACKGROUND OF THE INVENTION

1. Field of Invention

The present invention relates to a device and terminal for communicably connecting a user-owned portable terminal and multiple printing devices situated at various localities via a network, receiving data printing requests from the portable terminal, and outputting data relating to the data printing requests to one of the printing devices. Particularly, the present invention relates to a data output control device and portable terminal suitably used for readily obtaining detailed information on a network.

2. Description of Related Art

In recent years, information on the Internet can be readily obtained at any location by using i-mode (Registered Trademark) provided by NTT DoCoMo, Inc., for example. However, with such portable terminals, while information on the Internet can be readily obtained at any location, the display capabilities are usually of a simple configuration due to considerations such as reduction in size of the portable terminal and reduction in power consumption and so forth. Therefore, the information displayed is quite simplified as compared to that displayed on a normal personal computer, and does not come close to providing information which sufficiently satisfies the users.

Accordingly, a proposal can be made for an arrangement for obtaining detailed information while maintaining the small size and reduction in power consumption of the portable terminal, by combining a portable terminal with a printing device, so as to display general information on the portable terminal and print detailed information with the printing device. However, there are several problems which must be technically solved for such an arrangement combining a portable terminal with a printing device.

For example, a printing device can be large and not readily carried along with a portable terminal, so printing detailed information using a printing device set up in the home or office can be conceived. However, by using such a fixed particular printing device, information is far from being readily obtainable at any location. Accordingly, in order to realize portable printing there is the need to either reduce the printing device to a portable level, or to arrange for arbitrary printer devices to be used. In the case of the former, it is extremely difficult to technologically realize this at the current state, so this is not realistic. In the case of the later, unique drivers are necessary for each printing device, so drivers for all printing devices to be used must be installed in the portable terminal, which also is not realistic.

SUMMARY OF THE INVENTION

Accordingly, the present invention has been made in light of such unsolved problems, and it is an object thereof to provide a data output control device and portable terminal suitably used for readily obtaining detailed information on a network.

In order to achieve the above objects, the present invention provides a data output control device and a portable terminal. FIG. 1 is a diagram illustrating the configuration of the data output control device and portable terminal according to the present invention.

As shown in FIG. 1, the data output control device 10 communicably connects to a user-owned portable terminal 20 which is portable and sends output requests for data, and a plurality of output terminals 21 situated at various locations for outputting data, via a network, so as to receive data output requests from the portable terminal 20, and output data relating to the data output requests to the output terminals 21. The data output control device can include a storage device 11 for storing output terminal position data for specifying the output terminal 21 installation location for each output terminal 21, a selecting device 12 for searching output terminal position data of the storage device 11 based on the portable terminal position data for specifying the position of the portable terminal 20, and selecting an output terminal 21 which is considered to be closest either distance-wise or time-wise, with the position of the portable terminal 20 as a reference, and an output device 13 for outputting data relating to the data output request to the output terminal 21 selected by the selecting device 12. The portable terminal position data can be generated based on position data relating to the position of the portable terminal 20 from base stations 22 to which the portable terminal 20 connects.

According to such a configuration, upon receiving a data output request from the portable terminal 20, portable terminal position data is generated based on the position data from the base stations 22, the output terminal position data of the storage device 11 is searched based on the generated portable terminal position data, the output terminal 21 which is considered to be closest either distance-wise or time-wise is selected by the selecting device 12 with the position of the portable terminal 20 as a reference, and the data relating to the data output request is output to the selected output terminal 21 by the output device 13. Then, the data is output by the output terminal 21.

Now, the selecting device 12 may be of any configuration so long as an output terminal 21 considered to be closest either distance-wise or time-wise is selected with the position of the portable terminal 20 as a reference. An output terminal 21 considered to be the closest either distance-wise or time-wise may be selected with the position of the portable terminal 20 as a reference, or multiple output terminals 21 considered to be closest either distance-wise or time-wise may be selected with the position of the portable terminal 20 as a reference. In the case of the latter, the selection can be narrowed by some sort of technique, e.g., by the user making specifications, to finally select one of the multiple output terminals 21.

Also, the output terminal 21 may be of any configuration so long as data is output, including for example a display device that displays data, audio output device that outputs data as audio or the like, or a printing device that prints data.

Also, the portable terminal position data is generated based on the position data from the base stations 22, but more specifically, any portable terminal position date is acceptable, for example, as long as it is generated based on the position of the portable terminal 20 measured by the base stations 22.

Now, the data relating to the data output request may be, for example, received from the portable terminal 20, or may be obtained from somewhere else other than the data output control device 10 and portable terminal 20. In the case of the latter, more specifically, the following configuration can be given. That is, the data output control device 10 further include a date obtaining device for communicably connecting via network to the data storing terminal for storing data and obtaining data relating to the data output requests from the data storing terminal, with the output device 13 arranged so as to output the data obtained by the obtaining device to the output terminal 21 selected by the selecting device 12.

According to such a configuration, upon receiving a data output request from the portable terminal 20, data relating to the data output request is obtained from the data storing terminal by the obtaining device, and the obtained data is output to the output terminal 21 selected by the selecting device 12, by the output device 13.

Further, as shown in FIG. 1, the data output control device 10 of the present invention which communicably connects to a user-owned portable terminal 20 which is portable and sends output requests for data, and a plurality of output terminals 21 situated at various locations for outputting data, via a network, so as to receive data output requests from the portable terminal 20, and output data relating to the data output requests to the output terminals 21. The data output control device 10 can include a storage device 11 for storing output terminal position data for specifying the output terminal 21 installation location for each output terminal 21, selecting device 12 for searching output terminal position data of the storage device 11 based on the portable terminal position data for specifying the position of the portable terminal 20, and selecting an output terminal 21 which is considered to be closest either distance-wise or time-wise, with the position of the portable terminal 20 as a reference, and an output device 13 for outputting data relating to the data output request to the output terminal 21 selected by the selecting device 12, wherein, for portable terminal position data, that generated by the portable terminal 20 can be used.

According to such a configuration, upon receiving a data output request from the portable terminal 20, the output terminal position data of the storage device 11 is searched based on the portable terminal position data generated by the portable terminal 20, the output terminal 21 which is considered to be closest either distance-wise or time-wise, with the position of the portable terminal 20 as a reference, is selected, by the selecting device 12, and data relating to the data output request is output to the selected output terminal 21, by the output device 13. Then, the data is output by the output terminal 21.

Now, the portable terminal position data is generated by the portable terminal 20, may be generated by the portable terminal 20 in any manner. More specifically, based on, for example, the position of the portable terminal 20 measured by the portable terminal 20, or position data relating to the position of the portable terminal 20 obtained by the portable terminal 20 from base stations 22 to which the portable terminal 20 is connected.

On the other hand, as shown in FIG. 1, the portable terminal 20 of the present invention is a portable terminal which uses the data output control device 10. The portable terminal 20 can include a position measuring device for measuring the position of the terminal, a position data generating device for generating the portable terminal position data based on the position measured with the position measuring device, and a data output request originating device for sending the data output requests containing portable terminal position data generated by the position data generating means to the data output control device 10.

According to such a configuration, the position of the portable terminal 20 is measured by the position measuring device, portable terminal position data is generated by the position data generating device, based on the measured position, and a data output request containing the generated portable terminal position data is sent to the data output control device 10 by the data output request originating device.

Now, the position measuring device may be of any configuration as long as the position of the portable terminal 20 is measured. For example, it may be configured such that the position of the portable terminal 20 is measured using externally obtained information by GPS or the like, or internally-generated information by a gyroscope, an accelerometer or the like.

Further, as shown in FIG. 1, the portable terminal 20 according to the present invention is a portable terminal which uses the data output control device 10. The portable terminal 20 can include a position data obtaining device for obtaining position data relating to the position of the terminal from base stations 22 to which the terminal connects, a position data generating device for generating the portable terminal position data based on the position data obtained by the position data obtaining device, and a data output request originating device for sending the data output requests containing portable terminal position data generated by the position data generating device to the data output control device 10.

According to such a configuration, position data is obtained from the base station 22 by the position measuring device. Portable terminal position data can be generated based on the obtained position data by the position data generating device, and a data output request containing the generated portable terminal position data is sent to the data output control device 10, by the data output request originating device.

BRIEF DESCRIPTION OF THE DRAWINGS

The invention is described in detail with reference to the following figures, wherein like numerals reference like elements, and wherein.

DETAILED DESCRIPTION OF PREFERRED EMBODIMENTS

Figure 1:
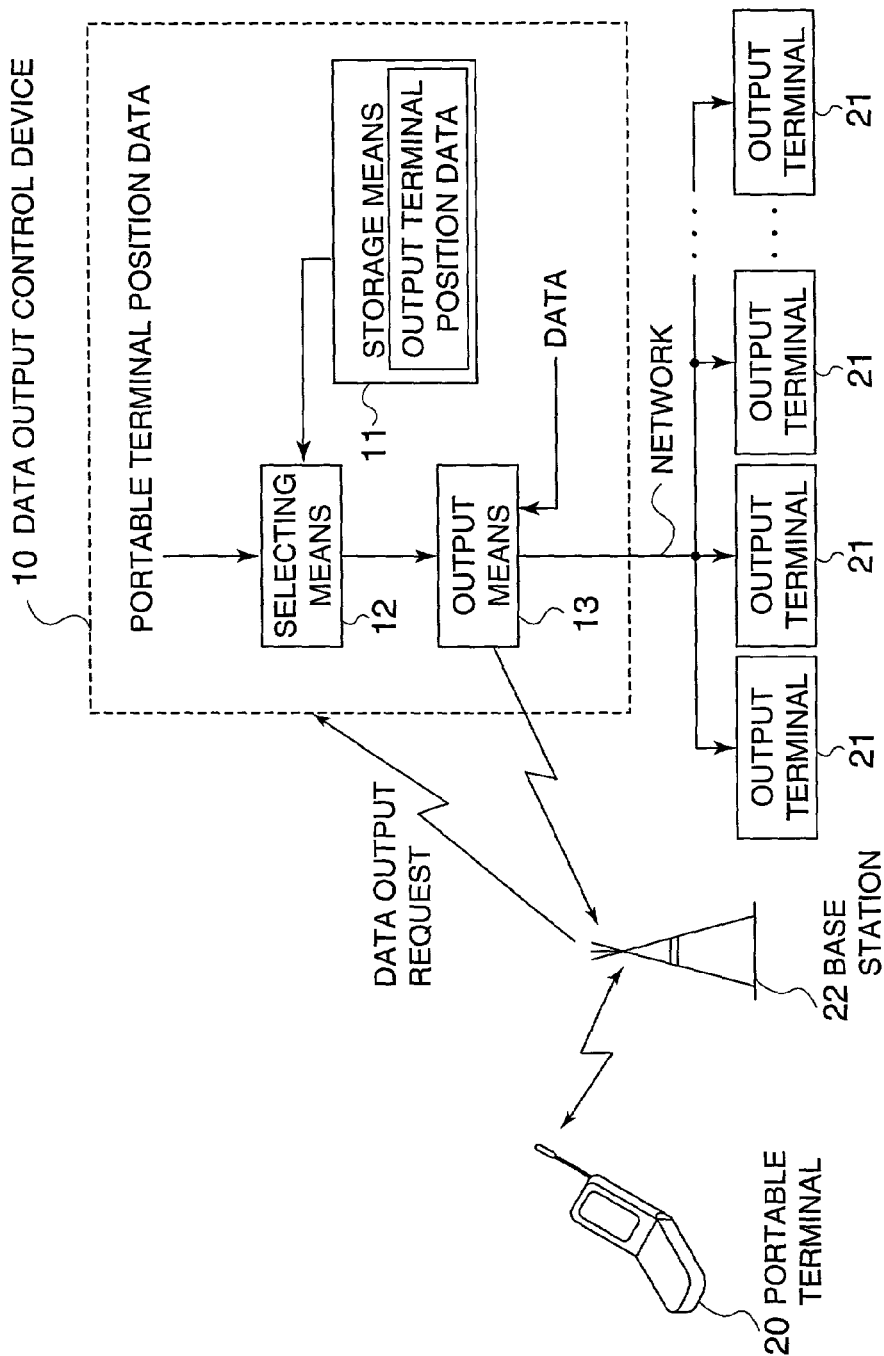
FIG. 1 is a conceptual diagram illustrating the configuration of the data output control device and portable terminal of the present invention.
Figure 2:
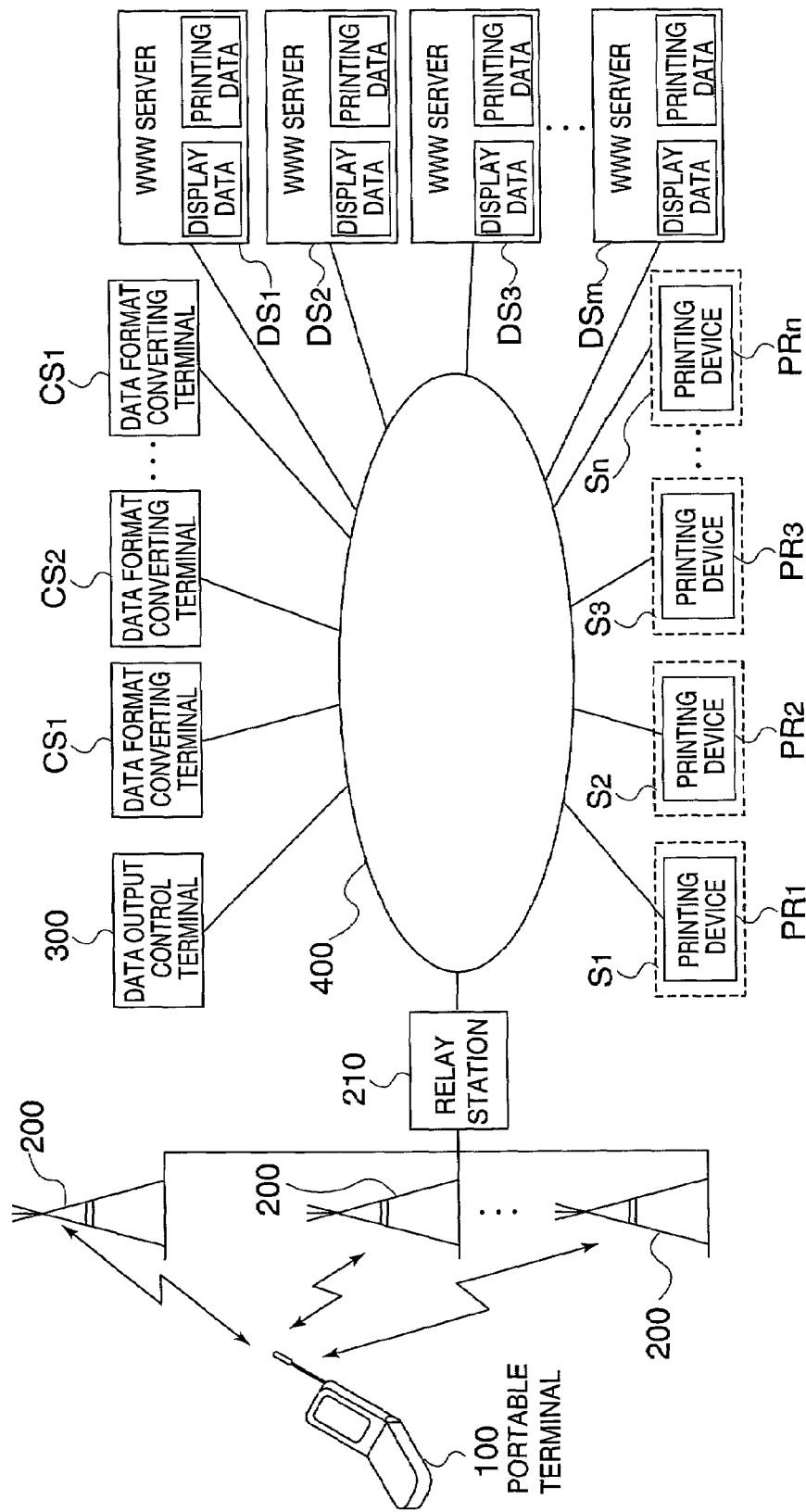
FIG. 2 is a block diagram illustrating the configuration of a network system to which the data output control device and portable terminal according to the present invention are applied.

FIG. 2 shows a data output control device and portable terminal according to the present invention applied to a service wherein a service provider, in accordance with printing requests for data from users, obtains data relating to the data printing request from one of WWW (World Wide Web) servers $DS_1$ through $DS_m$ and outputs this to one of printing devices $PR_1$ through $PR_n$, with a data output control terminal 300 which communicably connects a portable terminal 100 such as a cellular phone or the like which a user owns, and printing devices $PR_1$ through $PR_n$ each installed in a plurality of locally-situated shops $S_1$ through $S_n$, via the Internet 400. It is to be understood that while only one portable terminal 100 is shown in order to facilitate understanding of the invention, in reality a plurality of different models of portable terminals 100 can be connected to the Internet 400.

FIG. 2 is a block diagram illustrating the configuration of the network system to which the data output control device and portable terminal according to the present invention are applied. As shown in FIG. 2, connected to the Internet 400 are a relay station 210 for relaying communications between the portable terminal 100 and the Internet 400, printing devices $PR_1$ through $PR_n$ for printing data, WWW servers $DS_1$ through $DS_m$ for storing data, a data output control terminal 300 for obtaining data relating to a data printing request from one of the WWW servers $DS_1$ through $DS_m$ and outputting to one of the printing devices $PR_1$ through $PR_n$, and data format converting terminals $CS_1$ through $CS_l$ for converting the data obtained by the data output control terminal 300 into data which can be printed by the printing devices $PR_1$ through $PR_n$.

Multiple base stations 200 which perform wireless communication with the portable terminal 100 are connected to the relay station 210. In the event that the portable terminal 100 is to connect to the Internet 400, the relay station 210 serves as a terminal on the Internet 400 instead of the portable terminal 100, transmitting data received from the portable terminal 100 via a base station 200 to a target terminal via the Internet 400, and also transmitting data of the target terminal on the Internet 400 to the portable terminal 100 via the base station 200. The portable terminal 100 can simultaneously communicates with at least three base stations 200, the relay station 210 measures the time differences between the time when the airwave is sent from the portable terminal 100 and the time it reaches each base station 200 and measures the position of the portable terminal 100 based on the each measured time difference.

The WWW servers $DS_1$ through $DS_m$ can be configured of a storing unit for storing display data for displaying with the portable terminal 100 and printing data for printing with the printing devices $PR_1$ through $PR_n$ corresponding to the display data, and a request processing unit for transmitting data in the storing unit to terminals such as the relay station 210 and data output control terminal 300 connected to the Internet 400 according to the requests from the terminals.

The request processing unit transmits display data or printing data in the storage unit in the event that there is a data transmitting request from an external terminal (portable terminal 100, data output control terminal 300, etc.), which is a function realized by an unshown CPU executing programs stored in an external storage device or the like. Whether to transmit display data or printing data is judged by the URL contained in the data transmission request. The storing unit stores, as printing data, various files such as text data, still image data, sound data, moving picture data such as MPEG, 3-D image data such as VRML, program data such as JAVA and so forth, and HTML (HyperText Markup Language) files.

The data format converting terminals $CS_1$ through $CS_l$ are terminals for executing data format conversion processing for converting the data obtained by the data output control terminal 300 into data which can be printed by the printing devices $PR_1$ through $PR_n$, so that one or multiple data format converting terminals $CS_1$ through $CS_l$ are selected according to the sending load of the Internet 400 or the processing load of the data format converting terminals CS, and data format conversion processing is executed with the selected data format converting terminal CS. Specifically, one or multiple data format converting terminals $CS_1$ through $CS_l$ necessary for the data format conversion processing are selected in order of smaller sending load of the Internet 400 or processing load of the data format converting terminal CS.

The data format converting terminal CS where the data format converting processing is executed receives a data format conversion request and data to be converted from the data output control terminal 300, converts of the data obtained by the data output control terminal 300 that data of a predetermined format into data which can be printed by corresponding printing devices $PR_1$ through $PR_n$ by data format conversion processing, and transmits the converted data to the data output control terminal 300.

For example, in the event that format conversion processing is being executed with the data format converting terminals $CS_1$ through $CS_3$, this would be carried out in the manner of the data format converting terminal $CS_1$ converting data of a predetermined format A (e.g., HTML format) of the data obtained by the data output control terminal 300 into data which can be printed by the printing devices $PR_1$ through $PR_5$, the data format converting terminal $CS_2$ converting data of a predetermined format B (e.g., JPEG format) of the data obtained by the data output control terminal 300 into data which can be printed by the printing devices $PR_6$ through $PR_{10}$, and the data format converting terminal $CS_3$ converting data of a predetermined format C (e.g., WORD (Registered Trademark) document format) of the data obtained by the data output control terminal 300 into data which can be printed by the printing devices $PR_{11}$ through $PR_{15}$. In this case, the printing devices $PR_1$ through $PR_5$ apparently serve as devices for printing the data of the predetermined data format A in a dedicated manner, the printing devices $PR_6$ through $PR_{10}$ as devices for printing the data of the predetermined data format B in a dedicated manner, and the printing devices $PR_{11}$ through $PR_{15}$ as devices for printing the data of the predetermined data format C in a dedicated manner.

Also, the data format converting terminal CS where data format conversion processing is to be executed converts data obtained by the data output control terminal 300, and also generates preview data displayable on the portable terminal 100 which is a conceptual image of what will be printed by the printing device PR of the data obtained by the data output control terminal 300, for each portable terminal 100 model according to the display capabilities thereof (number of lines that can be displayed, display resolution, etc.), and transmits the generated preview data to the data output control terminal 300.

Accordingly, the data output control terminal 300 transmits data obtained from the data format conversion request and WWW server DS to the data format converting terminal CS corresponding to the printing device PR to print data relating to the data printing request, and receives as a response thereto data which can be printed by the printing device PR at which printing is to be carried out, and preview data.

Figure 3:
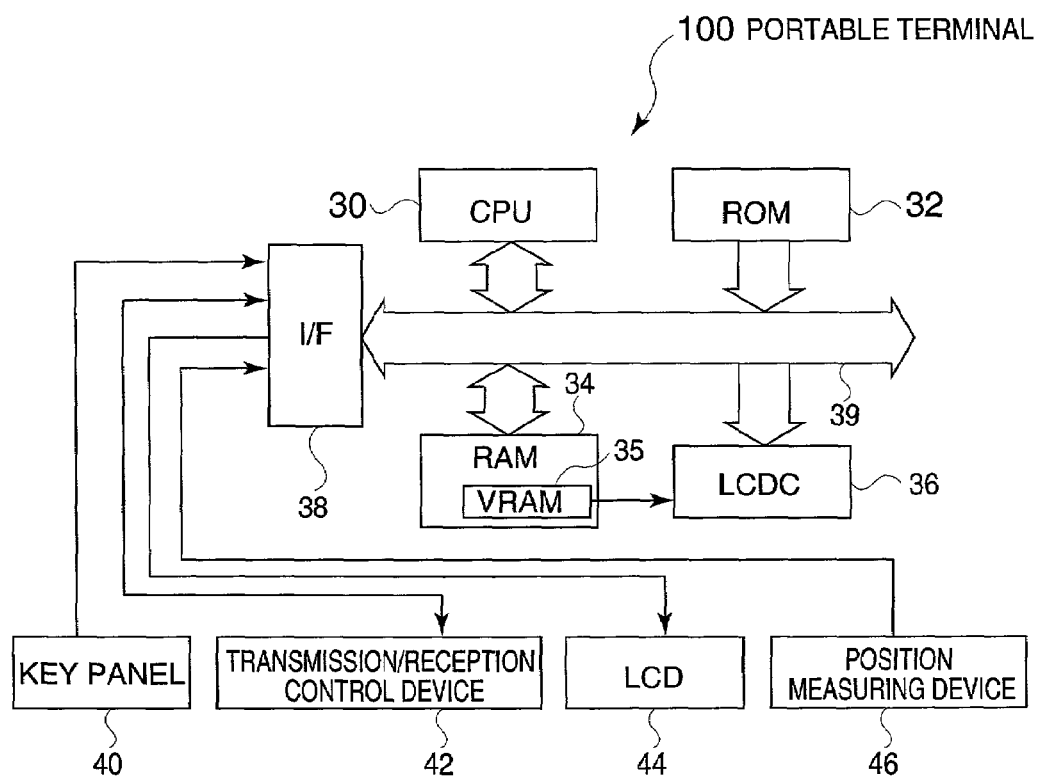
FIG. 3 is a block diagram illustrating the configuration of a portable terminal 100.

Next, the configuration of the portable terminal 100 will be described with reference to FIG. 3. FIG. 3 is a block diagram illustrating the configuration of the portable terminal 100.

As shown in FIG. 3, the portable terminal 100 is configured of a CPU 30 which controls computations and the entire system based on control programs, ROM 32 storing control programs for the CPU 30 and the like in predetermined areas beforehand, RAM 34 for storing the data read out from the ROM 32 and the like and computation results necessary in the computation processes of the CPU 30, a LCDC (Liquid Crystal Display Controller) 36 for converting data stored in a specified area of the RAM 34 into image signals and outputting to an LCD (Liquid Crystal Display) 44, and an interface 38 serving as a medium for input and output of data from and to external devices. The above elements being connected via a bus 39 which is a signal line for transferring data.

Connected to the interface 38 as external devices are a key panel 40 serving as a human interface where data input can be made by multiple keys, a transmission/reception control device 42 for performing wireless communication with base stations 200, an LCD 44 for displaying images based on image signals, and a position measuring device 46 for measuring the current position.

The ROM 32 stores, in addition to control programs for the CPU 30, verification data for verifying whether or not the user for using the printing service provided by the data output control terminal 300 is a valid user.

The RAM 34 has, as a specified area, VRAM 35 for storing display data for displaying on the LCD 44, with the VRAM 35 being independently accessible by the CPU 30 and the LCDC 36.

The LCDC 36 sequentially reads out the display data stored in the VRAM 35 at a predetermined cycle from the leading address, converts the display data that has been read out into image signals, and outputs to the LCD 44.

The position measuring device 46 can use GPS (Global Positioning System) or the like, and receives time signals from orbit satellites transmitting time signals for the current time, so as to measure the current position based on the offset in time indicated by the time signals and the orbits of the orbit satellites.

Figure 4:
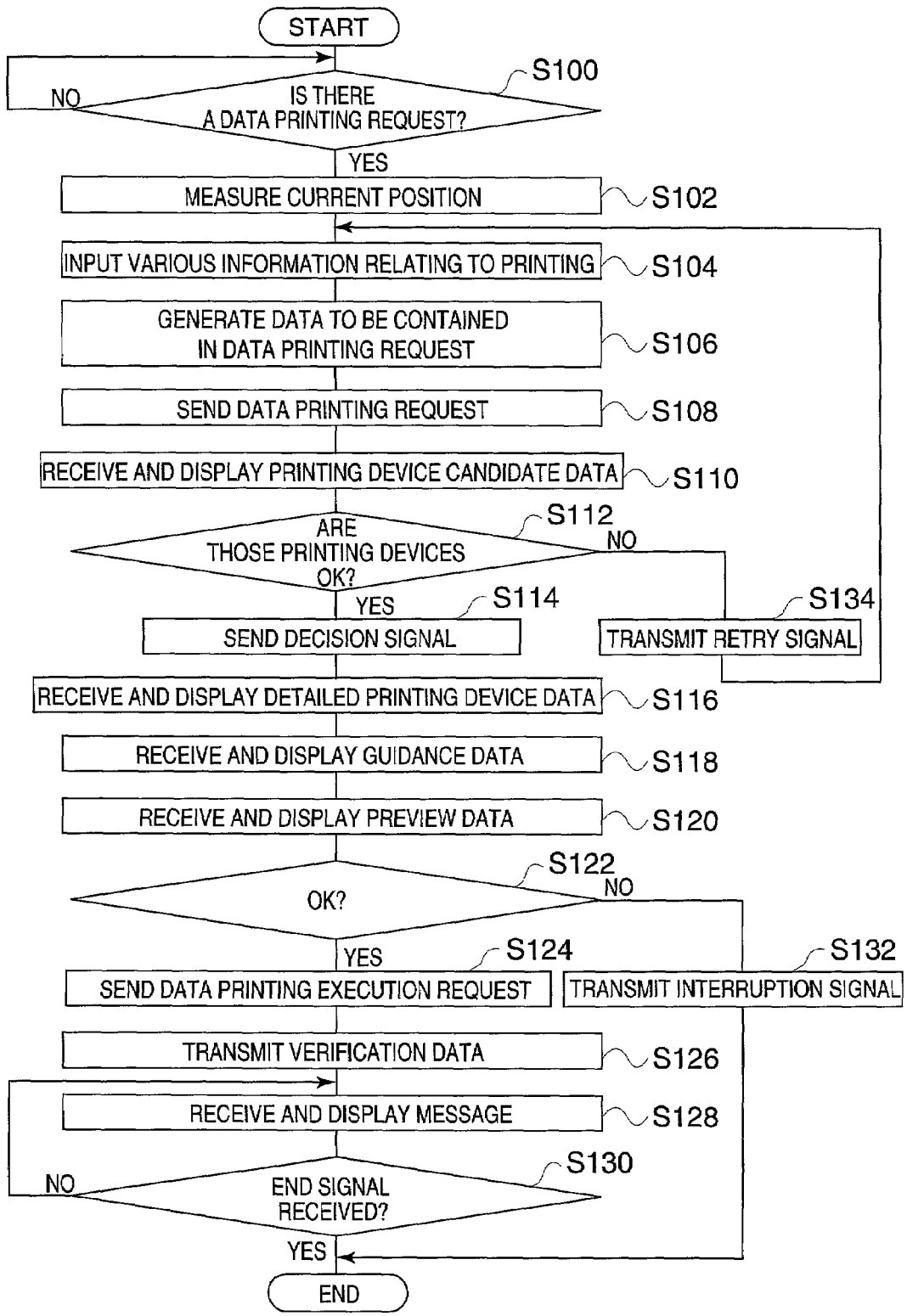
FIG. 4 is a flowchart illustrating data printing request processing.

The CPU 30 is made up of a micro-processing unit MPU and the like, for activating predetermined programs stored in predetermined areas of the ROM 32, and executing data printing request processing shown in the flowchart in FIG. 4 following the programs. FIG. 4 is a flowchart illustrating the data printing request processing. The data printing request processing is a processing for requesting printing of data of a WWW server DS specified by the user by one of the printing devices $PR_1$ through $PR_n$, by issuing a data printing request to the data output control terminal 300, and in the event that this is executed at the CPU 30, the flow goes to step S100, as shown in FIG. 4.

In step S100, a judgment is made regarding whether or not there has been a data printing request by input from the user with the key panel 40. In the event that judgment is made that there has been a data printing request (Yes), the flow proceeds to step S102 where the current position is measured by the position measuring device 46.

The flow then proceeds to step S104, and various information relating to printing is input from the key panel 40. The user inputs, as this various information relating to printing, for example, a URL which uniquely specifies the position in the Internet 400 of the WWW server DS storing the printing data to be printed, the desired providing area which is a general place where the user desires to be provided with the output data, paper size, whether color or monochrome, printing specifications of the printing device PR such as printing precision or printing speed or the like, the data format of the printing data to be printed, and a printing device ID for identifying a printing device PR in the event of directly specifying a printing device PR. None of these input items are indispensable items, and are to selectively input according to the needs of the user. However, in the event that there is no particular specification for the URL of the WWW server DS, the URL of the WWW server DS which the user is currently viewing with the portable terminal 100 can be automatically input.

Next, the flow proceeds to step S106, and data to be contained in the data printing request is generated, based on the various information relating to printing that has been input. In other words, the data to be contained in the data printing request is generated as portable terminal position data for specifying the current position measured in step S102 as a current position, as printing object storing position data indicating the URL of the WWW server DS, as desired providing area data indicating the desired providing area in the event that the desired providing area has been input, as printing specifications data indicating the printing specifications in the event that printing specifications for the printing device PR have been input, as printing format data indicating the data format in the event that the data format has been input, and as printing device identification data indicating the printing device ID in the event that the printing device ID of a printing device PR has been input.

Next, the flow proceeds to step S108 where the data printing request is transmitted to the data output control terminal 300. The flow then proceeds to step S110 where printing device candidate data listing candidates for several printing devices PR considered to be optimal for the user to be provided with the output data is received as a response thereof from the data output control terminal 300, the listed printing device PR candidates are displayed on the LCD 44 based on the received printing device candidate data, and the flow proceeds to step S112.

In step S112, a judgment is made regarding whether or not there is a printing device PR from which the user desires to be provided with the data output from the printing device PR candidates displayed on the LCD 44. In the event that judgment has been made that there is a printing device PR from which the user desires to be provided with the data output in the list of the printing device PR candidates displayed on the LCD 44 according to an input of a selected one thereof from the key panel 40 (Yes), the flow proceeds to step S114.

In step S114, a decision signal indicating that a printing device PR has been decided upon is transmitted to the data output control terminal 300, and the flow proceeds to step S116 where printing device information which is detailed information relating to the decided printing device PR (the location where the printing device PR is installed, printing specifications, etc.) is received from the data output control terminal 300 as a first response to the decision signal transmission. The detailed information relating to the printing device PR is displayed on the LCD 44 based on the received printing device information, and the flow proceeds to step S118.

In step S118, guidance data indicating guidance information (route information, map information, etc.) for guiding the user from the location of the portable terminal 100 to the location where the decided printing device PR is installed is received from the data output control terminal 300 as a second response to the decision signal transmission, the guidance information is displayed on the LCD 44 based on the received guidance data. The flow proceeds to step S120 where preview data is received from the data output control terminal 300 as a third response to the decision signal transmission, a conceptual image of the printing to be made by the decided printing device PR is displayed on the LCD 44 based on the received preview data, and the flow proceeds to step S122.

In step S122, a judgment is made with the conceptual image displayed on the LCD 44 regarding whether or not the printing data to be printed is correct. In the event that according to an input of a selection from the key panel 40 the conceptual image displayed on the LCD 44 is judged correct (Yes), the flow proceeds to step S124. At this time, in the event that the preview data is made up of multiple sets of data, a desired part of these can be specified in particular for printing.

In step S124, a data printing execution request is sent to the data output control terminal 300, the flow proceeds to step S126, verification data of the ROM 32 is sent to the data output control terminal 300. The flow then proceeds to step S128 where a message is received from the data output control terminal 300 as a response thereto, the received message is displayed on the LCD 44. The flow then proceeds to step S130 where a judgment is made regarding whether or not an end signal indicating that printing of the data ended has been received from the data output control terminal 300. In the event that judgement is made that an end signal has been received (Yes), the flow of processing ends, but in the event that judgment is made otherwise (No), step S128 is repeated until an end signal is received.

On the other hand, in step S122, in the event that according to an input of a selection from the key panel 40, the conceptual image displayed on the LCD 44 is judged incorrect (No), the flow proceeds to step S132 where an interruption signal which is a request to interrupt printing of the data is transmitted to the data output control terminal 300, and the flow of processing ends.

On the other hand, in step S112, in the event that a judgment is made that there is no printing device PR by which the user desires to be provided with output of data according to an input of a selection from the key panel 40 indicating that there is no printing device PR which the user desires among the candidates of the printing device PR displayed on the LCD 44 (No), the flow proceeds to step S134 where a retry signal which is a signal for re-searching for printing devices PR considered to be optimal for the user to be provided with the output data is transmitted to the data output control terminal 300, and the flow then proceeds to step S104.

On the other hand, in step S100, in the event that a judgment is made that there has not been a data printing request from the user (No), the flow stands by at step S100 until there is a data printing request.

Figure 5:
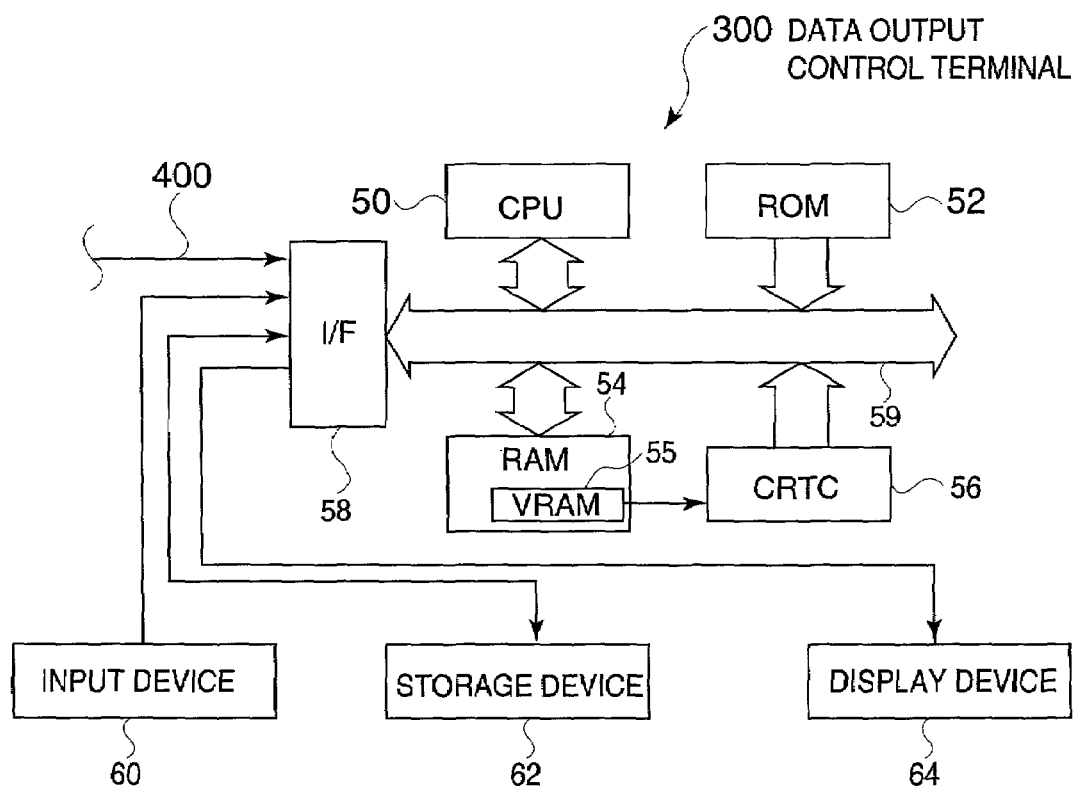
FIG. 5 is a block diagram illustrating the configuration of a data output control terminal 300.

Next, the configuration of the data output control terminal 300 will be described with reference to FIG. 5. FIG. 5 is an exemplary block diagram illustrating the configuration of the data output control terminal 300.

As shown in FIG. 5, the data output control terminal 300 is arranged so as to obtain data relating to the data printing request from the portable terminal 100, selecting one of the printing devices $PR_1$ through $PR_n$ to print with, and output the obtained data to the selected printing device PR. The data output control terminal 300 can include a CPU 50 which controls computations and the entire system based on control programs, ROM 52 storing the control programs and the like in predetermined areas beforehand, RAM 54 for storing the data read out from the ROM 52 and the like and computation results necessary for the computation processes of the CPU 50, a CRTC 56 for converting data stored in a specified area of the RAM 54 into image signals and for outputting the image signals, and an interface 58 serving as a medium for input and output of data from and to external devices. The above elements being coupled together via a bus 59 which is a signal line for transferring data.

Connected to the interface 58 as external devices are a input device 60 can include a keyboard or mouse or the like serving as a human interface where data input can be made, a storage device 62 for storing data and tables and the like as files, a display device 64 for displaying images based on image signals, and a signal line for connecting to the Internet 400.

The RAM 54 has, as a specified area, VRAM 55 for storing display data for displaying on the display device 64, with the VRAM 55 being independently accessible by the CPU 50 and the CRTC 56.

The CRTC 56 sequentially reads out the display data stored in the VRAM 55 at a predetermined cycle from the leading address, converts the display data that has been read out into image signals, and outputs them to the display device 64.

The storage device 62 stores printing device information relating to printing devices PR necessary for selecting one of the printing devices $PR_1$ through $PR_n$ to print the data with. The printing device information for each of the printing devices $PR_1$ through $PR_n$ includes printing device position data for specifying the location where that printing device PR is installed, printing format data indicating the data format which the data format converting terminal CS corresponding to that printing device PR can convert (i.e., data formats which that printing device PR can print), printing specifications data indicating the printing specifications of that printing device PR, and printing device identification data indicating the printing device ID, these data having been registered.

Figure 6:
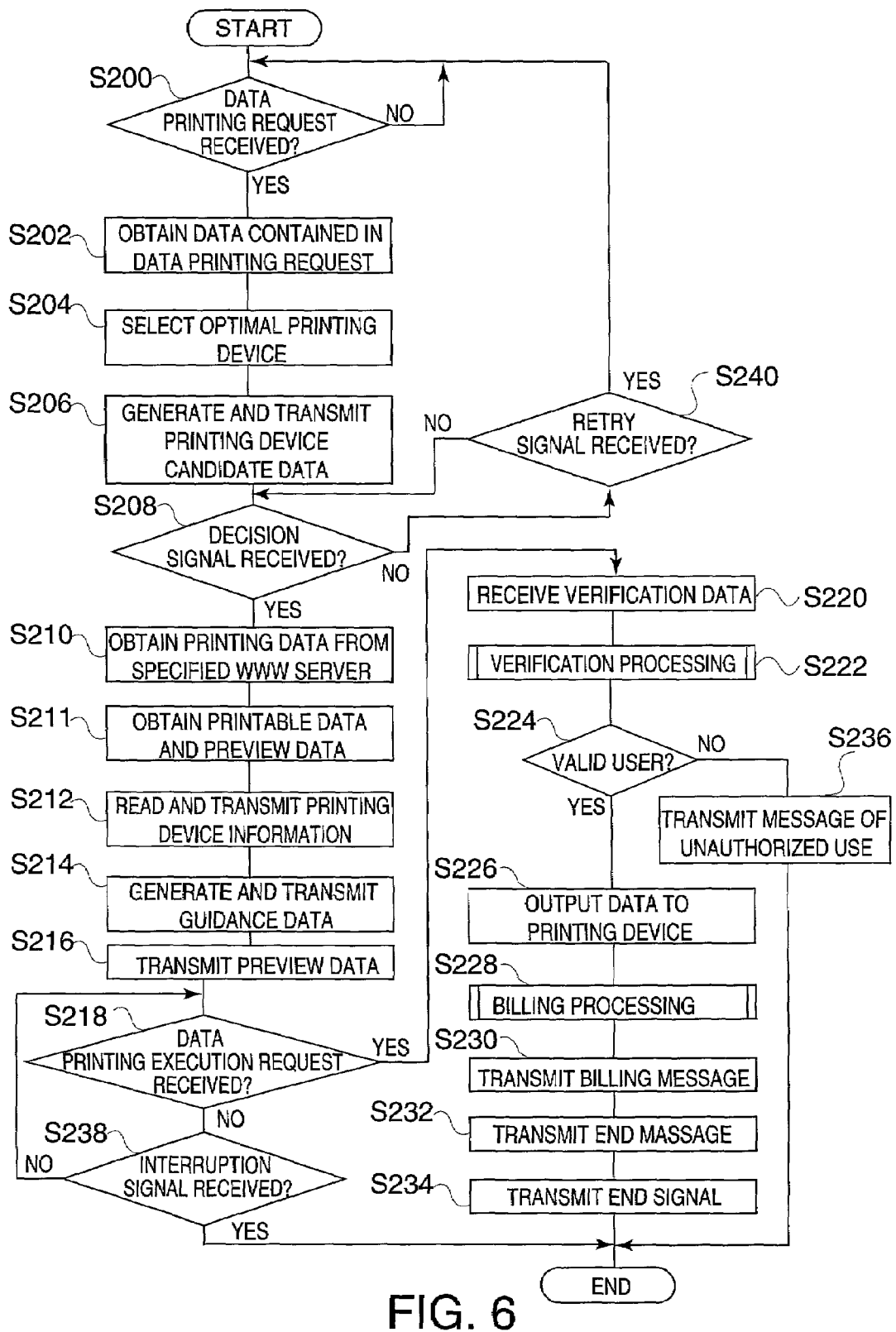
FIG. 6 is a flowchart illustrating data output control processing.

The CPU 50 can include a micro-processing unit MPU and the like, for activating predetermined programs stored in predetermined areas of the ROM 52, and executing data output control processing shown in the flowchart in FIG. 6 following the programs. FIG. 6 is a flowchart illustrating the data output control processing.

The data output control processing includes obtaining from the WWW server DS the printing data relating to the data printing request from the portable terminal 100, selecting several printing devices PR considered to be optimal for the user of the portable terminal 100 to be provided with the output data, and outputting the obtained printing data to the selected printing device PR, and in the event that this is executed at the CPU 50, the flow first goes to step S200, as shown in FIG. 6.

In step S200, a judgment is made regarding whether or not a data printing request has been received from the portable terminal 100. In the event that judgment is made that a data printing request has been received from the portable terminal 100 (Yes), the flow then proceeds to step S202 and obtains data contained in the received data printing request (containing at least portable terminal position data and printing object storing position data). The flow then proceeds to step S204, and selects a printing device PR considered to be optimal for the user of the portable terminal 100 to be provided with the output data.

Specifically, in step S204, the printing device position data of the storage device 62 is searched based on the obtained portable terminal position data, and several printing devices PR considered to be closest distance-wise or time-wise, based on the position of the portable terminal 100, are selected. In the event that desired providing area data is contained in the data printing request, the printing device position data of the storage device 62 is searched based on the desired providing area data to select all printing devices PR in the area specified by the desired providing area data. In the event that printing specifications data is contained in the data printing request, the printing specifications data of the storage device 62 is searched based on the obtained printing specifications data to select all printing devices PR matching that printing specifications data.

Also, in the event that printing format data is contained in the data printing request, the printing format data of the storage device 62 is searched based on the obtained printing format data to select all printing devices PR matching that printing format data. In the event that printing device identification data is contained in the data printing request, the printing device identification data of the storage device 62 is searched based on the obtained printing device identification data to select the printing device PR matching that printing device identification data. In the event that a combination of such data is contained in the data printing request, the selection is narrowed based on each of the data. However, in the event that desired providing area data is contained, but the position specified by the portable terminal position data is not contained in the area specified by the desired providing area data, the selection is not narrowed by the portable terminal position data, and in the event that printing device identification data is contained, the selection is not narrowed by other data.

Next, in step S206, printing device candidate data listing the printing devices PR selected in step S204 is generated. The generated printing device candidate data is transmitted to the portable terminal 100, and the flow proceeds to step S208.

In step S208, a judgment is made regarding whether or not decision signals have been received from the portable terminal 100. In the event that judgment is made that decision signals have been received (Yes), the flow then proceeds to step S210 and printing data is obtained from the WWW server DS specified by the URL of the obtained printing object storing position data, the flow proceeds to step S211, the obtained printing data is transmitted to a data format converting terminal CS capable of converting the printing data and corresponding to the decided printing device PR, data which can be printed by the decided printing device PR and preview data is obtained from the data format converting terminal CS as a response thereto, and the flow proceeds to step S212.

In step S212, printing device information regarding the printing device PR decided upon is read out from the storing device 62, the read printing device information is transmitted to the portable terminal 100. The flow then proceeds to step S214 where guidance data regarding the printing device PR decided upon is generated. The generated guidance data is transmitted to the portable terminal 100, the flow proceeds to step 216, the pre view data is transmitted to the portable terminal 100, and the flow proceeds to step S218.

In step S218, a judgment is made regarding whether or not a data printing execution request has been received from the portable terminal 100. In the event that judgment is made that a data printing request has been received (Yes), the flow proceeds to step S220 and receives verification data from the portable terminal 100. The flow then proceeds to step S222 where verification processing is executed based on the received verification data for verifying whether or not the user of the portable terminal 100 is a valid user for using the printing service provided by the data output control terminal 300, and the flow proceeds to step S224.

In step S224, a judgment is made regarding whether or not the user of the portable terminal 100 is a valid user based on a result of the verification processing performed in step S222. In the event that judgment is made that the user is a valid user (Yes), the flow proceeds to step S226 and the data which can be printed by the decided printing device PR is transmitted to that printing device PR. The flow then proceeds to step S228, and billing processing for performing billing according to the results of use of the printing service provided by the data output control terminal 300 by the portable terminal 100 is executed.

In this step S228, specifically, the telephone bill of the portable terminal 100 (e.g., telephone bill per minute) is calculated, the service usage fees according to the usage results of the portable terminal 100 are calculated making reference to a fee calculating stipulation table defining the service usage fees as prices of the printing services provided for, the amount of printing data obtained, the number of sheets printed with the printing device PR, and the printing specifications of the printing device PR, for example, as usage results of the portable terminal 100, the calculated service usage fees are added to the telephone bill, and the added total amount is stored as an invoice amount for the user of the portable terminal 100.

Next, the flow proceeds to step S230 where a billing message indicating the service usage fees calculated by the billing processing in step S228 is transmitted to the portable terminal 100. The flow then proceeds to step S232 where an end message indicating that printing of data has ended is transmitted to the portable terminal 100. The flow then proceeds to step S234 where an end signal is transmitted to the portable terminal 100, and the flow of processing ends.

On the other hand, in the event that judgment is made in step S224 that the user of the portable terminal 100 is not a valid user (No), the flow proceeds to step S236 where a message to the effect that the user is an invalid user is transmitted to the portable terminal 100, and the flow of processing ends.

On the other hand, in the event that judgment is made in step S218 that a data printing execution request has not been received from the portable terminal 100 (No), the flow then proceeds to step S238 where a judgment is made regarding whether or not an interruption signal has been received from the portable terminal 100, and in the event that judgment is made that an interruption signal has been received (Yes), the flow of processing ends, but in the event that judgment is made otherwise (No), the flow proceeds to step S218.

On the other hand, in the event that judgment is made in step S208 that a decision signal has not been received from the portable terminal 100 (No), the flow proceeds to step S240, judgment is made regarding whether or not a retry signal has been received from the portable terminal 100, and in the event that judgment is made that a retry signal has been received (Yes) the flow proceeds to step S200, but in the event that judgment is made otherwise (No), the flow proceeds to step S208.

On the other hand, in the event that judgment is made in step S200 that a data printing request has not been received from the portable terminal 100 (No), the flow stands by in step S200 until a data printing request is received.

Next, the operation of the above embodiment will be described.

First, in the event that a valid user for using the printing services provided by the data output control terminal 300 operates the portable terminal 100 which they have, and accesses, for example, a WWW server DS$_1$, display data of the WWW server DS$_1$ is displayed on the LCD 44. Description will be made regarding the example of a case where the user is to print detailed data of the data displayed on the LCD 44 at this time.

In order for the user to print the object data, first, a data printing request is input from the key panel 40. Once the data printing request is input, the current position of the portable terminal 100 is measured by the CPU 30 with the portion measuring device 46, through steps S100 and S102, and input requests for various information relating to the printing are displayed on the LCD 44. Now, if the user specifies the URL of the WWW server $DS_1$ currently being viewed by inputting it as the various information relating to the printing, portable terminal position data and printing object storing position data are generated as data to be contained in the data printing request, based on the input various information relating to printing, through the steps S104 to S108, and the data printing request is transmitted to the data output control terminal 300.

At the data output control terminal 300, upon receiving the data printing request, the CPU 50 obtains data contained in the received data printing request (the portable terminal position data and printing object storing position data) through the steps S200 to S204. The printing device position data of the storing device 62 is searched based on the obtained portable terminal position data, and several printing devices PR considered to be the closest distance-wise or time-wise with the position of the portable terminal 100 as a reference, are selected. At this time, saying that printing devices $PR_1$ through $PR_5$ are selected, printing device candidate data listing the printing devices $PR_1$ through $PR_5$ is generated through step S206, and the generated printing device candidate data is transmitted to the portable terminal 100.

At the portable terminal 100, upon receiving the printing device candidate data, the listed printing devices $PR_1$ through $PR_5$ are displayed on the LCD 44 based on the received printing device candidate data, through step S110. Now, in the event that the user inputs a selection of the printing device $PR_1$ from the key panel 40, a decision signal indicating that the printing device $PR_1$ has been decided is transmitted to the data output control terminal 300, through the steps S112 and S114.

At the data output control terminal 300, upon receiving the decision signal, printing data from the WWW server $DS_1$ specified by the URL of the obtained printing object storing position data is obtained through the steps S208 to S211. The obtained printing data is transmitted to a data format converting terminal CS capable of converting the printing data and corresponding to the decided printing device $PR_1$ (e.g., the data format converting terminal $CS_1$), and data capable of being printed by the decided printing device $PR_1$ and preview data are obtained from the data format converting terminal $CS_1$ as a response thereto. Then, in steps S212 through 216, printing device information regarding the decided printing device $PR_1$ is read out from the storing device 62, and transmitted to the portable terminal 100, guidance data regarding the decided printing device $PR_1$ is generated, the generated guidance data is transmitted to the portable terminal 100, and preview data is transmitted to the portable terminal 100.

At the portable terminal 100, upon receiving the printing device information, guidance data, and preview data, the detailed information relating to the printing device PR is displayed on the LCD 44 based on the received printing device information, guidance information from the location of the portable terminal 100 to the location where the printing device $PR_1$ is installed is displayed on the LCD 44 based on the received guidance data, and a conceptual image of the printing performed by the decided printing device $PR_1$ is displayed on the LCD 44 based on the received preview data, through the steps S116 to S120. Now, in the event that the user inputs from the key panel 40 a selection indicating that the conceptual image displayed on the LCD 44 is correct as the printing data to be printed, the data printing execution request and verification data of the ROM 32 are transmitted to the data output control terminal 300 through the steps S122 to 126.

At the data output control terminal 300, upon receiving the data printing execution request and the verification data, verification processing is executed through the steps S218 to S222 based on the received verification data. Here, the user is a valid user for using the printing service provided by the data output control terminal 300, so the data which can be printed by the decided printing device $PR_1$ is transmitted to the printing device $PR_1$ through the steps S224 to S234, the billing processing is executed, and the billing message, end message, and end signal are transmitted to the portable terminal 100.

At the portable terminal 100, upon receiving the billing message, end message, and end signal, the billing message and end message are displayed on the LCD 44 again through steps S128 and 130. On the other hand, upon receiving data capable of being printed by the printing device $PR_1$, printing is performed by the printing device $PR_1$, based on the received data.

After the end message is displayed, the user goes to the shop $S_1$ where the printing device $PR_1$ is installed, following the guidance information displayed on the LCD 44, and receives the data printed by the printing device $PR_1$. The service usage fees as the price of the printing services provided is added to the telephone bill of the portable terminal 100 and invoiced.

On the other hand, the service provider can receive the price of providing the service by adding the service usage fees as the price of the printing services provided to the telephone bill and invoicing the user.

Now, in the event that the user inputs as the various information relating to printing, a desired providing area which is a general area where the user desires to be provided with the output data, desired providing area data indicating the desired providing area is transmitted to the data output control terminal 300, at the data output control terminal 300 the printing device position data of the storage device 62 is searched based on the obtained desired providing area data, and all printing device PR in the area specified by the desired providing area data are selected.

For example, in the event that the user inputs "Shibuya" as the desired providing area, all printing devices PR installed around Shibuya are displayed on the LCD 44 of the portable terminal 100.

Also, in the event that the user inputs as the various information relating to printing, printing specifications for the printing device PR, printing specifications data indicating the printing specifications is transmitted to the data output control terminal 300, and at the data output control terminal 300, the printing specifications data of the storage device 62 is searched based on the obtained printing specifications data, and all printing devices PR matching the printing specifications data are selected.

For example, in the event that the user inputs "Color" as the printing specifications, all printing devices PR capable of printing data in color are displayed on the LCD 44 of the portable terminal 100.

Also, in the event that the user inputs as the various information relating to printing, data format, printing format data indicating the data format is transmitted to the data output control terminal 300, and at the data output control terminal 300, the printing format data of the storage device 62 is searched based on the obtained printing format data, and all printing devices PR matching the printing format data are selected.

For example, in the event that the user inputs "HTML" as the data format, all printing devices PR corresponding to data format converting terminals CS capable of converting HTML format data are displayed on the LCD 44 of the portable terminal 100.

Also, in the event that the user inputs as the various information relating to printing, the printing device ID of the printing device PR for directly specifying the printing device PR, printing device identification data indicating that printing device ID is transmitted to the data output control terminal 300, and at the data output control terminal 300, the printing device identification data of the storage device 62 is searched based on the obtained printing device identification data, and the printing device PR matching the printing device identification data is selected.

For example, in the event that the user inputs "0001" as the printing device ID, the printing device PR with the printing device ID "0001" is displayed on the LCD 44 of the portable terminal 100. In the event that no printing device PR with a printing device ID "0001" exists, no printing device PR is displayed at all.

Also, in the event that the user inputs as the various information relating to printing, a combination of desired printing area, printing specifications, and data format, data indicating each is transmitted to the data output control terminal 300, and at the data output control terminal 300, the selection is narrowed down based on the multiple sets of obtained data, and all matching printing devices PR are selected.

For example, in the event that the user inputs "Shibuya", "Color", and "HTML" as the desired printing area, printing specifications, and data format, all printing devices PR that are situated around Shibuya and are capable of printing the data in color are displayed on the LCD 44 of the portable terminal 100, from among the printing devices PR corresponding to data format converting terminals CS capable of converting HTML format data.

Also, in the event that the user is not a valid user for using the printing service provided by the data output control terminal 300, at the time that the conceptual image is displayed on the LCD 44, inputting from the key panel 40 a selection indicating that the conceptual image displayed on the LCD 44 is correct as the printing data to be printed does not result in printing the object data by the printing device $PR_1$.

Thus, with the present embodiment, the data output control terminal 300 receives a data printing request containing the portable terminal position data generated by the portable terminal 100, searches printing device position data of the storage device 62 based on the portable terminal position data contained in the data printing request, select a printing device PR which is considered to be closest either distance-wise or time-wise with the position of the portable terminal 100 as a reference, and outputs data relating to the data printing request to the selected printing device PR.

Accordingly, data relating to the data printing request is printed at a printing device PR considered to be the closest distance-wise or time-wise with the position of the portable terminal 100 as a reference, so the user can receive the output data more readily that with conventional arrangements, and can obtain detailed information on the Internet 400 readily. Also, the portable terminal position data is generated with the portable terminal 100, so the processing load placed upon the data output control terminal 300 is reduced as compared to cases wherein the portable terminal position data is generated at the data output control terminal 300. Particularly, in cases where the data output control terminal 300 is simultaneously accessed by a great number of portable terminals 100, the effect of reducing the processing load is remarkable, so the possibility that the time required up to receiving the output data will be greatly delayed can be reduced. Accordingly, the service provider can provide even more satisfying information services to the user, and can provide printing services for a more comfortable printing environment.

Further, with the present embodiment, the data output control terminal 300 searches for printing device position data of the storage device 62 based on the desired providing area data contained in the data printing request, and selects printing devices PR in the area specified by the desired providing area data.

Accordingly, data relating to the data printing request is printed by a printing device PR in the desired providing area which is a general location where the user desires to be provided with the output data, so the user can receive the output data according to their object, and thus can receive detailed information on the Internet 400 even more readily. Accordingly, the service provider can provide even more satisfying information services to the user.

Further, with the present embodiment, the data output control terminal 300 does not search for portable terminal position data in the event that a position specified by portable terminal position data does not exist in the area specified by the desired providing area data contained in the data printing request.

Accordingly, in the event that the user inputs a desired providing area, priority is given to searching with the desired providing area data over searching with the portable terminal position data, and data relating to the data printing request is printed by a printing device PR in the desired providing area, so the user can receive the output data with priority given to their object, and thus can receive detailed information on the Internet 400 even more readily. Accordingly, the service provider can provide even more satisfying information services to the user.

Further, with the present embodiment, the data output control terminal 300 searches for printing format data of the storage device 62 based on the printing format data contained in the data printing request, and selects printing devices PR matching the printing format data.

Accordingly, data relating to the data printing request is printed by a printing device PR capable of printing with the data format specified by the user, so the user can receive the output data according to their object, and thus can receive detailed information on the Internet 400 even more readily. Accordingly, the service provider can provide even more satisfying information services to the user.

Further, with the present embodiment, the data output control terminal 300 searches for printing specifications data of the storage device 62 based on the printing specifications data contained in the data printing request, and selects printing devices PR matching the printing specifications data.

Accordingly, data relating to the data printing request is printed by a printing device PR capable of printing with the printing specifications specified by the user, so the user can receive the output data according to their object, and thus can receive detailed information on the Internet 400 even more readily. Accordingly, the service provider can provide even more satisfying information services to the user.

Further, with the present embodiment, the data output control terminal 300 searches for printing device identification data of the storage device 62 based on only the printing device identification data contained in the data printing request, and selects the printing device PR matching the printing device identification data.

Accordingly, data relating to the data printing request is printed by the printing device PR uniquely specified by the user, so the user can receive the output data according to their object, and thus can receive detailed information on the Internet 400 even more readily. Accordingly, the service provider can provide even more satisfying information services to the user.

Further, with the present embodiment, the data output control terminal 300 outputs printing device information corresponding to the selected printing device PR to the portable terminal 100.

Accordingly, notifying the user of information relating to the printing device PR which will provide the output data can prevent the user from mistakenly printing data. Accordingly, the service provider can provide even more satisfying information services to the user.

Further, with the present embodiment, the data output control terminal 300 obtains data relating to the data printing request from a WWW server DS.

Accordingly, at the time of printing detailed information, printing data and data printable by the printing device PR are processed by the data output control terminal 300, so increased memory for the portable terminal 100 is unnecessary, and the processing load placed on the portable terminal 100 is reduced. Also, there is no need to read the data into the portable terminal 100, so the communication time is reduced, and the amount of time required to receive the output data is reduced. Accordingly, the service provider can provide printing services for a comfortable printing environment to the user, regardless of the functions of the portable terminal 100.

Further, with the present embodiment, the data output control terminal 300 selects one of the multiple printing devices PR based on portable terminal position data for specifying the position of the portable terminal 100.

Accordingly, data is printed by a printing device PR which is selected according to the position of the portable terminal 100, so, for example, selecting a printing device PR considered to be the closest distance-wise or time-wise with the position of the portable terminal 100 as a reference would allow the user to receive the output data even more readily, and the user can obtain detailed information on the Internet 400 even more readily. Accordingly, the service provider can provide even more satisfying information services to the user.

Further, with the present embodiment, the data output control terminal 300 obtains data from a WWW server DS specified by a URL of printing object storing position data contained in the data printing request. Thus, detailed information can be obtained from all WWW servers DS connected to the Internet 400. Accordingly, the service provider can provide even more satisfying information services to the user.

Further, with the present embodiment, the data output control terminal 300 obtains printing data from a WWW server DS as data relating to the data printing request. Thus, general information is displayed on the portable terminal 100 and detailed information is printed at the printing device PR, so detailed information on the Internet 400 can be obtained with the portable terminal 100, while realizing comfortable display processing. Accordingly, the service provider can provide even more satisfying information services to the user, and can provide a more comfortable printing environment and printing services to the user.

Further, with the present embodiment, the data output control terminal 300 transmits preview data generated with a data format converting terminal CS to the portable terminal 100, and upon receiving a data printing execution request from the portable terminal 100 as a response to the output of the preview data, outputs data relating to the data printing request to the printing device PR. Thus, preview data is notified to the user before providing the output data, thereby preventing the user mistakenly printing out data. Accordingly, the service provider can provide even more satisfying information services to the user.

Further, with the present embodiment, the data output control terminal 300 performs billing according to the results of the use by the portable terminal 100 of printing services provided by the data output control terminal 300. Thus, the service usage fees can be clearly calculated as the price of printing service provided, and also service usage fees do not have to be calculated each time the user receives a printing service. Accordingly, the service provider can readily handle office work for settling service fees and further clarify service usage fees for the user, and thus provide even more satisfying information services to the user.

Further, with the present embodiment, the data output control terminal adds the service usage fees as the price of printing service provided to the telephone bill. Accordingly, payment of the service usage fees becomes easier for the user, and the service provider can collect service usage fees easily and in a more sure manner and can further easily handle office work for settling service usage fees.

Further, with the present embodiment, the data output control terminal 300 outputs data converted by the data format converting terminal CS to the printing device PR. Thus, even in the event that a new printing device PR is installed, all that is necessary is to change the settings of the data format converting terminal CS regarding that new printing device PR at the service provider side, and the user an use the new printing device PR without making any changes in the settings at the user side. Accordingly, setting work which accompanies installing new printing devices PR becomes easy for service providers, and service providers can further provide even more satisfying information services to the user.

Further, with the present embodiment, the data output control terminal 300 transmits guidance data indicating guidance information, for guiding the user from the position of the portable terminal 100 to the position where the decided printing device PR is installed, to the portable terminal 100. Thus, the user can follow the guidance information to go to the position where the printing device PR is installed, and thus can obtain the output data in a relatively sure manner. Accordingly, the service provider can provide even more satisfying information services to the user.

Further, with the present embodiment, the portable terminal 100 measures the current position with the position measuring device 46, generates portable terminal position data based on the measured position, and outputs a data printing request containing the generated portable terminal position data to the data output control terminal 300.

Accordingly, data relating to the data printing request is printed by a printing device PR considered to be the closest distance-wise or time-wise with the position of the portable terminal 100 as a reference, so the user can receive the output data more readily than with conventional arrangements, and can obtain detailed information on the Internet 400 readily. Also, the portable terminal position data is generated with the portable terminal 100, so the processing load placed upon the data output control terminal 300 is reduced as compared to cases wherein the portable terminal position data is generated at the data output control terminal 300. Particularly, in cases where the data output control terminal 300 is simultaneously accessed by a great number of portable terminals 100, the effect of reducing the processing load is remarkable, so the possibility that the time required up to receiving the output data will be greatly delayed can be reduced. Accordingly, the service provider can provide even more satisfying information services to the user, and can provide printing services for a more comfortable printing environment.

Further, with the present embodiment, the data format converting terminals $CS_1$ through $CS_1$ select one or a plurality of the data format converting terminals $CS_1$ through $CS_1$ according to the sending load of the Internet 400 or the processing load of a data format converting terminal CS, so as to execute data format conversion processing with the selected data format converting terminal CS.

Accordingly, data format conversion processing is executed with data format converting terminals CS with a small sending load of the Internet 400 or the processing load, so the time required to receive the output data becomes approximately constant, regardless of the sending load of the Internet 400 or the processing load of the data format converting terminal CS. Accordingly, the service provider can provide printing services for a more comfortable printing environment to the user.

In the above embodiment, the printing device PR corresponds to the output terminal in claim 2, the storage device 62 corresponds to the storing means in claim 2, step S204 corresponds to the selecting means in claim 2, and step S226 corresponds to the output means in claim 2.

Now, with the above embodiment, the data output control terminal 300 is configured so as to search printing device position data of the storage device 62 based on portable terminal position data generated by the portable terminal 100, but the present invention is not restricted to this. It is to be understood that the data output control terminal 300 may be configured so as to generate portable terminal position data based on position data relating to the position of the portable terminal 100 from base stations 200 to which the portable terminal 100 is connected, and search printing device position data of the storage device 62 based on the generated portable terminal position data. Advantages the same as those of the above embodiment can be obtained with such a configuration, as well.

Also, with the above embodiment, the portable terminal 100 is configured so as measure its current position with the position measuring device 46, and generate portable terminal position data based on the measured position, but the present invention is not restricted to this. It is to be understood that the portable terminal 100 may be configured so as to obtain position data relating to the position of the portable terminal 100 from base stations 200 to which the portable terminal 100 is connected, and generate portable terminal position data based on the obtained position data. Advantages the same as those of the above embodiment can be obtained with such a configuration, as well.

Also, the above embodiment is configured such that a printing device PR which is considered to be the closest distance-wise or time-wise with the position of the portable terminal 100 as a reference, a printing device PR in an area specified by desired providing area data, a printing device PR matching printing format data, a printing device PR matching printing specifications data, or a printing device PR matching printing device identification data is selected as a printing device PR considered to be optimal for the user of the portable terminal 100 to receive output data, but the present invention is not restricted to this, and further, it may be configured such that, for example, a printing device PR which is considered to be able to provide the user with the output data fastest, taking into consideration the data output speed of the printing device PR, or a printing device PR with the most inexpensive price for providing the output data, is selected.

According to the former configuration, data relating to the data printing request is printed by a printing device PR which is considered to be able to provide the user with the output data fastest, so the user can receive output data meeting his/her object, and can obtained detailed information on the Internet 400 even more readily. Accordingly, the service provider can provide even more satisfying information services to the user.

According to the latter configuration, data relating to the data printing request is printed by a printing device PR with the most inexpensive price for providing the output data, so the user can receive output data meeting his-her object, and can obtained detailed information on the Internet 400 even more readily. Accordingly, the service provider can provide even more satisfying information services to the user.

Also, the above embodiment is configured such that printing devices $PR_1$ through $PR_n$ for printing data are provided, and data relating to data printing requests from a portable terminal 100 are printed by one of the printing devices PR, but the present invention is not restricted to this, and such a configuration may be made where, for example, an output device for displaying data or for outputting data as audio is provided, and data relating to the data output request from the portable terminal 100 is output at any of such output devices.

Also, the above embodiment is configured so as to generate preview data with a data format converting terminal CS, but the present invention is not restricted to this, and may be configured so as to generate preview data at the data output control terminal 300.

Also, the above embodiment is configured such that the data format converting terminals $CS_1$ through $CS_1$ select one or a plurality of the data format converting terminals $CS_1$ through $CS_1$ according to the sending load of the Internet 400 or the processing load of a data format converting terminal CS, so as to execute data format conversion processing with the selected data format converting terminal CS, but the present invention is not restricted to this, and may be configured so as to execute data format conversion processing with a specified data format converting terminal.

Also, the above embodiment is configured so as to execute the processing shown in the flowcharts in FIG. 4 and FIG. 6 with a specified data output control terminal 300, but the present invention is not restricted to this, and may be configured such that, seen in the data format converting terminals $CS_1$ through $CS_1$ multiple data output control terminals are provided, and one of the multiple data output control terminals is selected according to the sending load of the Internet 400 or the processing load of the data output control terminals to curry out the processing.

According to such a configuration, the processing shown in the flowcharts in FIG. 4 and FIG. 6 is executed with a data output control terminal with a small sending load of the Internet 400 or the processing load, so the time required to receive the output data becomes approximately constant, regardless of the sending load of the Internet 400 or the processing load of the data output control terminal. Accordingly, the service provider can provide printing services for a more comfortable printing environment to the user.

Also, the above embodiment has been described with regard to a case of applying the data output control device and portable terminal according to the present invention to the Internet 400, but the present invention is not restricted to this, and as a matter of course can be applied to networks other than the Internet 400.

Also, the above embodiment has been described with regard to an arrangement where the portable terminal 100, data format converting terminals $CS_1$ through $CS_1$, WWW servers $DS_1$ through $DS_m$, printing devices $PR_1$ through $PR_n$, and data output control terminal 300 are connected via the same network, but the present invention is not restricted to this, and an arrangement may be made wherein the data output control terminal 300 and the portable terminal 100, the data output control terminal 300 and the data format converting terminals $CS_1$ through $CS_1$, the data output control terminal 300 and the WWW servers $DS_1$ through $DS_m$, and the data output control terminal 300 and the printing devices $PR_1$ through $PR_n$, are each connected via different networks.

Also, the above embodiment has been described with regard to an arrangement wherein the processing shown in the flowcharts in FIG. 4 and FIG. 6 is executed by executing control programs stored beforehand in the ROMs 32 and 52, but the present invention is not restricted to this, and may read programs from a storage medium storing programs indicating these procedures into the RAMs 34 and 54, to execute.

Now, a storage medium is a semiconductor storage medium such as RAM or ROM, a magnetic storage type storage medium such as an FD or HD, an optical reading type storage medium such as a CD, CDV, LD, or DVD, or a magnetic storage type/optical reading type storage medium such as an MO, and includes any storage media as long as the storage medium is computer-readable, regardless of the reading method, whether electric, magnetic, optic, or so forth.

Also, in the above embodiment, the data output control device and portable terminal according to the present invention are applied to a case of providing a service where, as shown in FIG. 2, a service provider obtains data relating to a data printing request from one of WWW servers $DS_1$ through $DS_m$ according to the data printing request from a user, with a data output control device 300 to output from one of printing devices $PR_1$ through $PR_n$, but the present invention is not restricted to this, and is applicable to other cases without departing from the spirit and scope of the present invention.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention.

The invention claimed is:

1. A data output control device, which communicably connects to a user-owned portable terminal which is portable and sends data output requests, at least one data format converting terminal, and a plurality of output terminals situated at various locations for outputting data, via a network, so as to receive data output requests from said portable terminal, and output data relating to said data output requests to said output terminals, the at least one data format converting terminal converting the output data into at least one data format that is printable by at least one of the output terminals, the data output control device comprising:

a storage device that stores output terminal position data for specifying the output terminal installation location for each output terminal;

a selecting device that searches output terminal position data of said storage device based on the portable terminal position data for specifying the position of said portable terminal, and selects an output terminal that is capable of rendering a data format converted by the at least one data format converting terminal, and is considered to be closest, either distance-wise or time-wise, with the position of said portable terminal as a reference; and an output device for outputting data relating to said data output request to the output terminal selected by said selecting device, wherein said portable terminal position data is generated based on position data relating to the position of said portable terminal from base stations to which said portable terminal connects.

2. A data output control device, which communicably connects to a user-owned portable terminal which is portable and sends data output requests, at least one data format converting terminal, and a plurality of output terminals situated at various locations for outputting data, via a network, so as to receive data output requests from said portable terminal, and output data relating to said data output requests to said output terminals, the at least one data format converting terminal converting the output data into at least one data format that is printable by at least one of the output terminals, the data output control device, comprising:

a storage device that stores output terminal position data for specifying the output terminal installation location for each output terminal;

a selecting device that searches output terminal position data of said storage device based on the portable terminal position data for specifying the position of said portable terminal, and selects an output terminal that is capable of rendering a data format converted by the at least one data format converting terminal, and is considered to be closest, either distance-wise or time-wise, with the position of said portable terminal as a reference; and an output device that outputs data relating to said data output request to the output terminal selected by said selecting device, wherein the portable terminal position data is generated by said portable terminal.

3. The portable terminal which uses the data output control device according to claim 2, comprising:

a position measuring device that measures the position of said terminal;

a position data generating device that generates said portable terminal position data based on the position measured with said position measuring device; and a data output request originating device that sends said data output requests containing portable terminal position data generated by said position data generating device to said data output control device.

4. The portable terminal which uses the data output control device according to claim 2, comprising:

a position data obtaining device that obtains position data relating to the position of said terminal from base stations to which said terminal connects;

a position data generating device that generates said portable terminal position data based on the position data obtained by said position data obtaining device; and a data output request originating device that sends said data output requests containing the portable terminal position data generated by said position data generating device to said data output control device.

* * * * *